US005376727A

United States Patent [19]

Iqbal et al.

[11] Patent Number: 5,376,727

[45] Date of Patent: Dec. 27, 1994

[54] POLYMERIC BLAND OF A MATRIX RESIN AND ABSORBENT RESIN AND A MULTIVALENT METAL ION CROSSLINKING AGENT

[75] Inventors: Mohammad Iqbal, Austin, Tex.; Terrance P. Smith, Woodbury; Stofko, Jr., St. Paul, both of Minn.

[73] Assignee: Minnesota Mining and Manufacturing Company, Saint Paul, Minn.

[21] Appl. No.: 89,744

[22] Filed: Jul. 9, 1993

Related U.S. Application Data

[62] Division of Ser. No. 602,732, Oct. 24, 1990, Pat. No. 5,241,006.

[51] Int. Cl.$^5$ .................................................. C08F 8/00

[52] U.S. Cl. ...................................... 525/196; 525/56; 525/57; 525/204; 525/205; 525/903; 428/475.2; 428/478.2

[58] Field of Search .................... 525/56, 57, 196, 204, 525/205, 903; 428/475.2, 478.2

[56] References Cited

U.S. PATENT DOCUMENTS

| | | | |
|---|---|---|---|
| 3,892,905 | 7/1975 | Albert | 525/57 |
| 4,300,820 | 11/1981 | Shah | 525/205 |
| 4,369,229 | 1/1983 | Shah | 428/520 |
| 4,442,258 | 4/1984 | Sunakawa et al. | 524/762 |
| 4,481,326 | 11/1984 | Sonenstein | 525/57 |
| 4,503,111 | 3/1985 | Jaeger et al. | 428/195 |
| 4,547,405 | 10/1985 | Bedell et al. | 427/256 |
| 4,554,181 | 11/1985 | Cousin et al. | 427/261 |
| 4,555,437 | 11/1985 | Tanck | 428/212 |
| 4,578,285 | 3/1986 | Viola | 427/209 |
| 4,590,227 | 5/1986 | Nakamura et al. | 525/57 |
| 4,592,951 | 6/1986 | Viola | 428/323 |
| 4,636,805 | 1/1987 | Toganoh et al. | 428/210 |
| 4,642,247 | 2/1987 | Mouri et al. | 427/214 |
| 4,741,969 | 5/1988 | Hayama et al. | 525/57 |
| 4,970,193 | 11/1990 | Liang et al. | 503/201 |
| 4,980,393 | 12/1990 | Shu | 525/130 |
| 5,134,198 | 7/1992 | Stofko et al. | 525/205 |
| 5,147,930 | 9/1992 | LaFleur et al. | 525/56 |
| 5,192,617 | 3/1993 | Stofko et al. | 525/205 |
| 5,208,092 | 5/1993 | Iqbal | 428/195 |
| 5,219,928 | 6/1993 | Stofko et al. | 525/57 |

FOREIGN PATENT DOCUMENTS

| | | |
|---|---|---|
| 0232040 | 8/1987 | European Pat. Off. . |
| 0233703 | 8/1987 | European Pat. Off. . |
| 0365307 | 4/1990 | European Pat. Off. . |
| 0297108 | 8/1990 | European Pat. Off. . |
| 61-1135788 | 6/1986 | Japan . |
| 61-230978 | 10/1986 | Japan . |
| 61-235182 | 10/1986 | Japan . |
| 61-235183 | 10/1986 | Japan . |
| 61-261089 | 11/1986 | Japan . |
| 61-293886 | 12/1986 | Japan . |
| 62-032079 | 2/1987 | Japan . |

*Primary Examiner*—Melvyn I. Marquis
*Assistant Examiner*—Randy Gulakowski
*Attorney, Agent, or Firm*—Gary L. Griswold; Walter N. Kirn; David L. Weinstein

[57] ABSTRACT

A composition comprising a blend of (a) a polymeric matrix component comprising crosslinkable polymers made from 80 to 99 parts by weight of at least one $\alpha,\beta$-ethylenically unsaturated monomer and from 1 to 20 parts by weight of at least one chelating compound, (b) a liquid-absorbent component comprising a water-absorbent, preferably water-soluble, polymer, and (c) a multivalent metal ion as a crosslinking agent. This composition is capable of forming liquid-absorbent, semi-interpenetrating networks. The composition of this invention can provide polymeric matrices which, when coated on a transparent backing, result in transparent coatings capable of providing improved combinations of ink absorption and durability, while at the same time retaining transparency and being amenable to the types of processing commonly used in producing transparent graphical materials.

31 Claims, No Drawings

POLYMERIC BLAND OF A MATRIX RESIN AND ABSORBENT RESIN AND A MULTIVALENT METAL ION CROSSLINKING AGENT

This is a division of application Ser. No. 07/602,732 filed Oct. 24, 1990 now U.S. Pat. No. 5,241,006.

BACKGROUND OF THE INVENTION

1. Field of the Invention

This invention relates to transparent materials that are capable of absorbing liquids, and, more particularly, to materials that can be used as ink-receptive layers for transparent imageable materials.

2. Discussion of the Art

Transparent materials that are capable of absorbing significant quantities of liquid, while maintaining some degree of durability and transparency, are useful in contact lenses, priming layers for coatings coated out of aqueous solutions, fog-resistant coatings, and transparent imageable materials for use with mechanized ink depositing devices, such as pen plotters and ink-jet printers. Transparent imageable materials are used as overlays in technical drawings and as transparencies for overhead projection. It is desirable that the surface of liquid absorbent materials for use in transparent graphical applications be tack free to the touch even after absorption of significant quantities of ink.

During normal use of pen plotters and ink-jet printers, the inks used in such machines are exposed to open air for long periods of time prior to imaging. After such exposure to air, the ink must still function in an acceptable manner, without loss of solvent. To meet this requirement, ink formulations typically utilize solvents of very low volatility, such as water, ethylene glycol, propylene glycol, and so on. Inks that contain water or water-miscible solvents are commonly referred to as aqueous inks, and the solvents for these inks are commonly referred to as aqueous liquids. Materials that are receptive to such aqueous liquids will hereinafter be referred to as hydrophilic compositions.

Because of the low volatility of aqueous liquids, drying of an image by means of evaporation is very limited. In the case of imaging onto a paper sheet which has a fibrous nature, a significant amount of the liquid diffuses into the sheet, and the surface appears dry to the touch within a very short time. In the case of imaging onto polymeric film, some means of absorbing aqueous liquids is needed if satisfactory drying of the image is to occur.

Compositions useful as transparent liquid absorbent materials have been formed by blending a liquid-insoluble polymeric material with a liquid-soluble polymeric material. The liquid-insoluble material is presumed to form a matrix, within which the liquid soluble material resides. Examples of such blends are the transparent water-absorbent polymeric materials disclosed in U.S. Pat. Nos. 4,300,820, 4,369,229, and in European Patent Application No. 0 233 703.

A problem that frequently arises in the formulation of polymer blends is the incompatibility of the polymers being blended. When attempts are made to blend polymers that are incompatible, phase separation occurs, resulting in haze, lack of transparency, and other forms of inhomogeneity.

Compatibility between two or more polymers in a blend can often be improved by incorporating into the liquid-insoluble matrix-forming polymer chains monomeric units that exhibit some affinity for the liquid-soluble polymer. Polymeric materials having even a small amount of acid functionality are more likely to exhibit compatibility with polyvinyl lactams. Generally, the compatibility of polymers being blended is improved if the polymers are capable of hydrogen bonding to one another.

A second form of incompatibility noted in using blends of liquid-absorbent polymers is the incompatibility of the matrix forming insoluble polymer with the liquid being absorbed. For example, if the liquid being absorbed is water, and if the water-insoluble polymers are hydrophobic, some inhibition of water absorption ability can be expected. One method of overcoming this difficulty is to utilize hydrophilic matrix polymers that are water-insoluble at the temperatures at which they are to be used, though they may be water-soluble at a different temperature. In U.S. Pat. No. 4,503,111, ink-receptive coatings comprising either polyvinyl alcohol or gelatin blended with polyvinyl pyrrolidone are disclosed. Both polyvinyl alcohol and gelatin, being water-insoluble at room temperature, are able to act as matrix-forming polymers for these coatings, and the coatings are quite receptive to aqueous inks. However, the coatings do exhibit a tendency to become tacky, either because of imaging, or because of high humidity.

It therefore becomes clear that while blends of soluble and insoluble polymers may be useful as liquid absorbent compositions, they suffer major limitations in liquid absorption ability and in durability.

SUMMARY OF THE INVENTION

This invention provides a composition comprising a blend of (a) a polymeric matrix component comprising crosslinkable polymers made from 80 to 99 parts by weight of at lease one $\alpha,\beta$-ethylenically unsaturated monomer and from 1 to 20 parts by weight of at least one chelating compound, (b) a liquid-absorbent component comprising a water-absorbent, preferably water-soluble, polymer, and (c) a multivalent metal ion as a crosslinking agent. This composition is capable of forming liquid-absorbent, semi-interpenetrating networks, hereinafter referred to as SIPNs. The SIPNs of this invention are polymeric blends wherein at least one of the polymeric components is crosslinked after blending to form a continuous network throughout the bulk of the material, and through which the uncrosslinked polymeric component or components are intertwined in such a way as to form a macroscopically homogeneous composition.

SIPNs of this invention are capable of absorbing significant quantities of those liquids that are solvents of the uncrosslinked portion of the SIPN without loss of physical integrity and without leaching or other forms of phase separation. In cases where the SIPNs are initially transparent, they also remain transparent after absorption of significant quantities of liquids.

The nature of the crosslinking used in the formation of the matrix component of the SIPN is such that it combines durability in the presence of the liquids encountered during use with compatibility toward the liquid-absorbent component. The crosslinked matrix component and the liquid-absorbent component are miscible, exhibit little or no phase separation, and generate little or no haze upon coating. The nature of the crosslinking should also be such that it does not interfere with pot-life and curing properties that are associated with commonly available methods of processing.

More particularly, crosslinking should be limited to the matrix component of the SIPN, and should not cause phase separation or other inhomogeneity in the SIPN.

This invention provides polymeric matrices which, when coated on a transparent backing, result in transparent coatings capable of providing improved combinations of ink absorption and durability, while at the same time retaining transparency and being amenable to the types of processing commonly used in producing transparent graphical materials.

DETAILED DESCRIPTION

The crosslinkable portion of the SIPN will hereinafter be called the matrix component, and the liquid-absorbent portion will hereinafter be called the absorbent component.

The matrix component of the SIPN of the present invention comprises crosslinkable polymers that are either hydrophobic or hydrophilic in nature, and are derived from the copolymerization of acrylic or other hydrophobic or hydrophilic ethylenically unsaturated monomers with monomers having acidic groups or chelating groups, or by hydrolysis, if pendant ester groups are already present in these ethylenically unsaturated monomers.

Hydrophobic monomers suitable for preparing crosslinkable matrix components generally have the following properties:

(1) They form water-insoluble homopolymers if polymerized with themselves.

(2) Polymers formed from them contain no pendant groups having more than 18 carbon atoms, preferably no more than 4 carbon atoms, and more preferably, 1 to 2 carbon atoms.

(3) Polymers formed from them have groups in their backbones or in substituents of their backbones that are capable of hydrogen bonding to enhance the absorption of water or other hydrogen-bonding liquids.

These monomers are preferably selected from:

(1) acrylates and methacrylates having the structure:

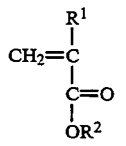

wherein $R^1$ represents hydrogen or $-CH_3$, and $R^2$ represents a member selected from the group consisting of alkyl groups having up to 18 carbon atoms, preferably, up to 4 carbon atoms, and more preferably, 1 to 2 carbon atoms, cycloaliphatic groups having up to 9 carbon atoms, aryl groups having up to 14 carbon atoms, and oxygen-containing heterocyclic groups having up to 10 carbon atoms;

(2) acrylonitrile or methacrylonitrile;

(3) styrene or α-methylstyrene having the structure:

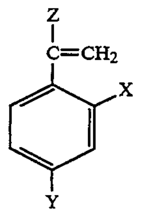

where X and Y independently represent hydrogen or alkyl groups having up to 4 carbon atoms, preferably 1 or 2 carbon atoms, a halogen atom, alkyl halide group, or $OR^m$ where $R^m$ represent hydrogen or an alkyl group having up to 4 carbon atoms, preferably 1 or 2 carbon atoms, and Z represents hydrogen or methyl; and (4) vinyl acetate.

Hydrophilic monomers suitable for preparing crosslinkable matrix components typically have the characteristic that they form water-soluble homopolymers when polymerized with themselves. They are preferably selected from:

( 1) Vinyl lactams having the repeating structure:

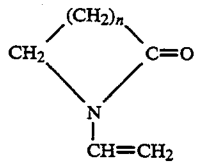

where n represents the integer 2 or 3.

(2) Acrylamide or methacrylamide having the structure:

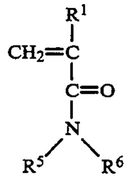

where $R^1$ is as described previously, $R^5$ represents hydrogen or an alkyl group having up to 10 carbon atoms, preferably having from 1 to 4 carbon atoms, and $R^6$ represents a member selected from the group consisting of hydrogen, alkyl groups having up to 10 carbon atoms, preferably having from 1 to 4 carbon atoms, and hydroxy-substituted alkyl groups or alkoxy-substituted alkyl groups having the structure of $-(CH_2)_p-OR^7$ where p represents an integer from 1 to 3, inclusive, and $R^7$ represents hydrogen or an alkyl group having up to 10 carbon atoms, preferably having from 1 to 4 carbon atoms.

(3) Tertiary amino alkylacrylates or tertiary amino alkylmethacrylates having the structure:

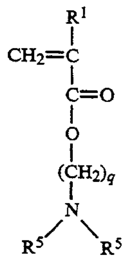

where a represents the integer 1 or 2 and $R^1$ and $R^5$ are as described previously, where each $R^5$ can be the same or different.

(4) Alkoxy alkylacrylates, hydroxy alkylacrylates, alkoxy alkylmethacrylates, or hydroxy alkylmethacrylates having the structure:

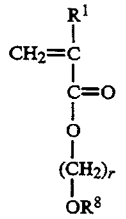

where r represents an integer from i to 4, inclusive, preferably 2 to 3, is as $R^1$ is as described previously, and $R^8$ represents hydrogen or an alkyl group having 1 to 4 carbon atoms.

(5) Alkoxy alkylacrylates or alkoxy alkylmethacrylates having the structure:

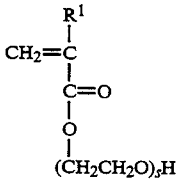

where s represents an integer from 5 to 25, inclusive, and $R^1$ is described previously.

Some of the structures of both the above-mentioned hydrophobic and hydrophilic monomeric units contain pendant ester groups, and these can be rendered crosslinkable by hydrolysis. For the others, monomers containing acidic-groups can be copolymerized with them to produce crosslinkable polymers. Suitable monomers containing acidic-groups include acrylic acid or methacrylic acid, other copolymerizable carboxylic acids, and ammonium salts. Monomers containing acidic-groups can also be grafted onto polymers.

When acrylic or methacrylic acid is used, the acidic group is present at a level of from about 1.0% to about 20% by weight of the crosslinkable polymer, and preferably from about 2.5% to 9% by weight. When ammonium salts are used, the amine structure can be as follows:

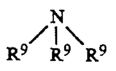

where $R^9$ independently represents hydrogen or an alkyl group having up to 5 carbon atoms, preferably 1 or 2 carbon atoms, with the preferred amine being $NH_3$ or another volatile amine. The matrix component also comprises a chelating compound. The preferred chelating compounds can be selected from:

(1) Alkaline metal salts of acrylic or methacrylic acid having the structure:

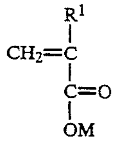

where $R^1$ is as described previously, and M represents Li, Na, K, Rb, Cs, or $NH_4$, preferably $NH_4$, Na, or K;

(2) N-substituted acrylamido or methacrylamido monomers containing ionic functionalities having the structure:

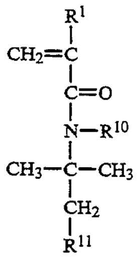

where $R^1$ is described previously, $R^{10}$ represents halogen or alkyl group having up to 4 carbon atoms, but preferably hydrogen atom, $R^{11}$ represents —COOM or —$SO_3M$ where M is described previously;

(3) Alkali metal salt of p-styrene sulfonic acid;

(4) Sodium salt of 2-sulfo ethyl acrylate or methacrylate;

(5) 2- and 4-vinyl pyridine;

(6) Vinyl imidazole;

(7) N-(3-aminopropyl)methacrylamide hydrochloride; and (8) 2-acetoacetoxy ethyl acrylate or 2-acetoacetoxyethyl methacrylate.

The matrix component is made by copolymerizing appropriate proportions of the above-mentioned hydrophilic or hydrophobic monomers and chelating compounds, using free-radical solution, emulsion, or suspension polymerization techniques. Typically, the matrix component comprises from about 80 to 99 parts by weight of hydrophilic or hydrophobic monomers and from about 1 to 20 parts by weight of chelating compound.

While it is the primary function of the matrix component of the SIPN to impart physical integrity and durability to the SIPN without adversely affecting the liquid-absorbency of the SIPN, it is the primary function of the absorbent component to promote liquid absorbency. When aqueous liquids are to be absorbed, as is in the case of most inks, the absorbent component can be water-absorbent, preferably water-soluble, and can be selected from polymers formed from the following monomers:

(1) Vinyl lactams having the repeating structure:

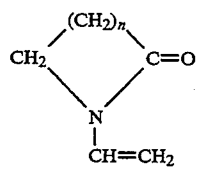

where n is as described previously.

(2) Alkyl tertiary amino alkylacrylates or alkyl tertiary amino alkylmethacrylates having the structure:

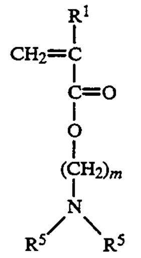

where m represents the integer 1 or 2, $R^1$ and $R^5$ are as described previously, and each $R^5$ can be the same or different.

(3) Alkyl quaternary amino alkylacrylates or alkyl quaternary amino alkylmethacrylates.

Polymerization of these monomers can be carried out by typical free-radical polymerization techniques as described previously.

Alternately, the absorbent component can also be selected from commercially available water-soluble or water-swellable polymers such as polyvinyl alcohol, polyvinyl alcohol/polyvinyl acetate copolymer, polyvinyl formal, polyvinyl butyral, gelatin, carboxy methylcellulose, hydroxy ethyl cellulose, hydroxy propyl cellulose, hydroxy ethyl starch, polyethyl oxazoline, polyethylene oxide, polyethylene glycol, polypropylene oxide. The preferred polymers are polyvinyl lactams, and, in particular, polyvinyl pyrrolidone, polyvinyl alcohol, and polyethylene oxide.

Crosslinking can be effected by means of multivalent metal ions, such as multivalent metal ion salts. The ions are preferably selected from the following metals: cobalt, calcium, magnesium, chromium, aluminum, tin, zirconium, zinc, nickel, and iron. Compounds that can provide these ions include aluminum acetate, aluminum ammonium sulfate dodecahydrate, alum, aluminum chloride, chromium (III) acetate, chromium (III) chloride hexahydrate, cobalt acetate, cobalt (II) chloride hexahydrate, cobalt (II) acetate tetrahydrate, cobalt sulfate hydrate, copper sulfate pentahydrate, copper acetate hydrate, copper chloride dihydrate, ferric chloride hexahydrate, ferric ammonium sulfate dodecahydrate, ferrous chloride tetrahydrate, magnesium acetate tetrahydrate, magnesium chloride hexahydrate, magnesium nitrate hexahydrate, manganese acetate tetrahydrate, manganese chloride tetrahydrate, nickel chloride hexahydrate, nickel nitrate hexahydrate, stannous chloride dihydrate, stannic chloride, tin (II) acetate, tin (IV) acetate, strontium chloride hexahydrate, strontium nitrate, zinc acetate dihydrate, zinc chloride, zinc nitrate, zirconium (IV) chloride, zirconium acetate, zirconium oxychloride, zirconium hydroxychloride, ammonium zirconium carbonate, and so on.

The SIPNs of this invention can be used to form ink-receptive layers for graphical materials. Typically, these SIPNs comprise from about 0.5 to 6.0% by weight of crosslinking agents, more preferably from about 1.0 to 4.5% by weight based on the total weight of the SIPN. The matrix component can be present at a level of from about 23.5 to about 98.5% by weight of the total SIPN, more preferably from about 30 to about 57% by weight. The absorbent component can be present at a level of from about 1 to about 70.5% by weight, and more preferably from about 38 to about 69% by weight. When polyvinyl pyrrolidone is present as the absorbent component of the SIPN and acrylates are used as the matrix component, good absorption of aqueous inks can be obtained at room temperature if polyvinyl pyrrolidone comprises at least about 30% by weight, preferably at least about 50% by weight, of the SIPN. Higher absorption can be obtained at the expense of durability if polyvinyl pyrrolidone is present in greater amounts. When polyvinyl pyrrolidone is present at about 80% by weight of the SIPN, the matrix component is not able to form a complete network, and the entire composition loses its physical integrity when washed with water.

In cases where the SIPNs of the invention are to be used as liquid-receptive layers borne by solid substrates, as in transparent graphical materials, it is convenient to apply such layers to the substrates in the form of a coatable composition that is subsequently dried to form a solid layer. A coatable composition can be prepared by dissolving the matrix component and the absorbent component in appropriate proportions in a common solvent, preferably water or a water miscible solvent, depending on the solubility of the components. The solvents can be selected on the basis of Hansen solubility parameters. The crosslinking agent is then added to the solution, and the solution is mixed until it becomes uniform. This solution can then be coated onto a transparent substrate, such as a polymeric film and allowed to dry. The amount of heat required to accomplish the drying in a reasonable time is usually sufficient for causing crosslinking of the matrix component to occur.

SIPN solutions of the present invention may contain additional modifying ingredients such as adhesion promoters, particles, surfactants, viscosity modifiers, and like materials, provided that such additives do not adverrsely affect the liquid-absorbing capability of the invention.

Coating can be carried out by any suitable means, such as by a knife coater, a rotogravure coater, a reverse roll coater, or other conventional means, as would be known to one of ordinary skill in the art. Drying can be accomplished by means of heated air. If preferred, an adhesion promoting priming layer can be interposed between the applied coating and the substrate. Such priming layers can include prime coatings. Alternatively, surface treatments, such as corona treatment, or other appropriate treatment, can be used to promote adhesion. These treatments are known to one of ordinary skill in the art. Adhesion of the SIPN layer can also be promoted by interposing a gelatin sublayer of the type used in photographic film backing between the priming layer and the SIPN layer. Film backings having both a priming layer and a gelatin sublayer are commercially available and are frequently designated as primed and subbed film backings.

When the SIPNs of the present invention are to be used to form the ink-absorbing layers of films for use with ink-jet printers, it is preferred that the backing of the film have a caliper in the range of about 50 to about 125 micrometers. Films having calipers below about 50 micrometers tend to be too fragile for graphic arts films, while films having calipers over about 125 micrometers tend to be too stiff for easy feeding through many of the imaging devices currently in use. Backing materials suitable for graphic arts films include polymeric materials, such as, for example, polyester, e.g., polyethylene terephthalate, cellulose acetates, polycarbonates, polyvinyl chloride, polystyrene, and polysulfones.

When the SIPNs of the present invention are to be used to form ink absorbing layers for films for ink-jet printing, the SIPN layer may further be overcoated with an ink-permeable anti-tack protective layer, such as, for example, a layer comprising polyvinyl alcohol in which starch particles have been dispersed, or a semi-interpenetrating polymer network in which polyvinyl alcohol is the absorbent component. An additional function of such overcoat layers is to provide surface properties that help to properly control the spread of ink droplets so as to optimize image quality.

In order to more fully illustrate the various embodiments of the present invention, the following non-limiting examples are provided. All parts are parts by weight unless indicated otherwise.

EXAMPLE 1

The polymeric material for the matrix of the SIPN was prepared by combining N-vinyl-2-pyrrolidone (28 parts by weight), N,N-dimethyl acrylamide (20 parts by weight), the ammonium salt of 2-acrylamido-2-methyl propanesulfonic acid (2 parts by weight), azo-bis-isobutyronitrile (0.07 part by weight, "Vazo", available from E. I. du Pont de Nemours and Company), and deionized water (280 parts by weight) in a one-liter brown bottle. After the mixture was purged with dry nitrogen gas for five minutes, polymerization was effected by immersing the bottle in a constant temperature bath maintained at a temperature of 60° C. for eight hours to give a very viscous clear solution (97.8% conversion). The resulting polymerized mixture was then diluted with deionized water to give a 10% solution in water (hereinafter Solution A).

Solution A (21.94 g of a 10% aqueous solution) was thoroughly mixed with polyvinyl alcohol(28.6 g of a 5% aqueous solution, "Vinol 540", available from Air Products and Chemicals, Inc.), and chromium chloride crosslinking agent (0.29 g of a 10% aqueous solution) in a separate vessel.

The resultant solution was coated onto a backing of polyethylene terephthalate film having a caliper of 100 micrometers, which had been primed with polyvinylidene chloride, over which had been coated a gelatin sublayer of the type used in photographic films for improving gelatin adhesion ("Scotchpar" Type PH primed and subbed film, available from Minnesota Mining and Manufacturing Company). Coating was carried out by means of a knife coater at a wet thickness of 200 micrometers. The coating was then dried by exposure to circulating heated air at a temperature of 90° C. for five minutes to form a clear SIPN layer.

Printing was performed with an ink-jet printer and pen using ink containing dye (3 to 5% solution in water). After one minute, the imaged film was dry to the touch. The SIPN layer remained intact.

Comparative Example A

Example 1 was repeated with the exceptions that the crosslinking agent was omitted, 15 g of Solution A was used, and 20.5 g polyvinyl alcohol was used. The ink on the imaged film did not dry after five minutes at ambient temperature.

EXAMPLES 2 to 4

The following compositions were prepared:

| Ingredient | Amount (g) B | C | D |
|---|---|---|---|
| N-vinyl-2-pyrrolidone | 35.0 | 35.0 | 35.0 |
| N,N-dimethyl acrylamide | 13.0 | 13.0 | 13.0 |
| Sodium salt of allyl ether sulfonate (COPS-1, 40% solution, available from Alcolac Specialty Chemicals) | 5.0 | — | — |
| Potassium salt of 3-sulfopropyl acrylate (available from Aldrich Chemical Co.) | — | 2.0 | — |
| Potassium salt of 3-sulfopropyl methacrylate (available from Aldrich Chemical Co.) | — | — | 2.0 |
| Azo-bis-isobutyronitrile ("Vazo") | 0.07 | 0.07 | 0.07 |
| Water | 283.0 | 283.0 | 283.0 |

Each composition was mixed in a separate bottle, each bottle purged with nitrogen, and each composition polymerized for 8 to 10 hours at a temperature of 60° C. The resulting resins were very viscous, and each was diluted with 100 g of deionized water. The percentage of conversion ranged from 80 to 95%. Each reacted composition was further diluted with deionized water to give a solution containing 10% by weight dry solids, and each was used to prepare the following compositions:

| Example no. | Amount of each ingredient (g) Composition B (10% aqueous solution) | Composition C (10% aqueous solution) | Composition D (10% aqueous solution) | Poly-(vinyl-alcohol) (10% aqueous solution) | Chromium chloride ($CrCl_3 \cdot H_2O$) (5%) aqueous solution) |
|---|---|---|---|---|---|
| 2 | 51 | | | 60 | 2.4 |
| 3 | | 35 | | 35 | 1.15 |
| 4 | | | 30 | 35 | 2.9 |

The composition of each example was thoroughly mixed and then knife coated onto a primed and subbed polyester film of the type described in Example 1 at a wet thickness of 100 micrometers and dried in conventional hot air oven at a temperature of 90° C. for five minutes. Then the coated films were imaged separately on a Hewlett-Packard Deskjet ink-jet printer. The imaged areas dried quickly and did not smear.

EXAMPLE 5

N-vinyl-2-pyrrolidone (40 parts by weight), 2-hydroxy ethyl methacrylate (7.5 parts by weight, available from Aldrich Chemical Co.), 4-vinyl pyridine (2.5 parts by weight, available from Reilly Tar and Chemical Co.), azo-bis-isobutyronitrile (0.07 part by weight, "Vazo"), deionized water (275 parts by weight), and ethyl alcohol (50 parts by weight) was mixed in a one pint bottle. The mixture was then purged with nitrogen gas. After the mixture was purged with nitrogen gas, it was polymerized for 18 to 20 hours at a temperature of 60° C. to give a very viscous opaque resin. The conversion was almost quantitive. The resulting resin was diluted to 7.5% by weight solids with deionized water.

A coatable solution containing the resin of this example (18.0 g of a 7.5% aqueous solution), polyvinyl alcohol (27.0 g of a 7.5% aqueous solution, "Vinol 540") and $CrCl_3.6H_2O$ (1.2 g of a 5.0% aqueous solution) was thoroughly mixed and then knife coated onto a primed and subbed polyester film of the type described in Example 1 at a wet thickness of 100 micrometers. The coating was then dried in an oven at a temperature of 95° C. for five minutes. The film was imaged on a Hewlett-Packard Deskjet ink-jet printer. The imaged area dried quickly and did not smear. The images did not wash away even after being soaked in water.

EXAMPLE 6

A polymerizable composition was prepared by mixing the following ingredients in the amounts indicated:

| Ingredient | Amount (parts by weight) |
|---|---|
| N-vinyl-2-pyrrolidone | 32.5 |
| N,N-dimethyl acrylamide | 15.0 |
| 2-Vinyl pyridine | 2.5 |
| Azo-bis-isobutyronitrile ("Vazo") | 0.07 |
| Deionized water | 278.0 |
| Ethyl alcohol | 5.0 |

The mixture was purged with nitrogen gas and then polymerized for 12 to 15 hours at a temperature of 60° C. The conversion was quantitative. The resulting resin was diluted to 7.5% by weight solids with deionized water.

The resin of this example (21.53 g of a 7.5% aqueous solution), polyvinyl alcohol (32.3 g of a 7.5% aqueous solution), and $CrCl_3.6H_2O$ (1.42 g of a 5.0% aqueous solution) were thoroughly mixed and the mixed composition was then knife coated onto a primed and subbed polyester film of the type described in Example 1 at a wet thickness of 100 micrometers. The coating was then dried in an oven at a temperature of 95° C. for five minutes. The film was imaged on a Hewlett-Packard Deskjet ink-jet printer. The imaged area dried quickly and did not smear.

EXAMPLE 7

A polymerizable composition was prepared by mixing the following ingredients in the amounts indicated:

| Ingredient | Amount (parts by weight) |
|---|---|
| N-vinyl-2-pyrrolidone | 47.5 |
| 2-Acetoacetoxy ethyl methacrylate (available from Eastman Kodak) | 2.5 |
| Azo-bis-isobutyronitrile ("Vazo") | 0.07 |
| Deionized water | 200.0 |
| Methyl alcohol | 50.0 |

The mixture was purged with nitrogen gas and then polymerized for 20 to 24 hours at a temperature of 60° C. to give a viscous opaque solution. The conversion was 96.04%. The resulting resin was diluted to 7.5% by weight solids with deionized water.

The resin of this example (21.53 g of a 7.5% aqueous solution), polyvinyl alcohol (32.6 g of a 7.5% aqueous solution), and $CrCl_3.6H_2O$ (0.69 g of a 5.0% aqueous solution) were thoroughly mixed and the mixed composition was then knife coated onto a primed and subbed polyester film of the type described in Example 1 at a wet thickness of 100 micrometers. The coating was then dried in an oven at a temperature of 95° C. for five minutes. The film was imaged on a Hewlett-Packard Deskjet ink-jet printer. The imaged area dried quickly and did not smear.

EXAMPLE 8

A mixture comprising N-vinyl-2-pyrrolidone (37.5 parts by weight), N,N-dimethyl acrylamide (10.0 parts by weight), 4-vinyl pyridine (1.5 parts by weight), 1-vinyl imidazole (1.0 part by weight, available from Aldrich Chemical Co.), azo-bis-isobutyronitrile (0.07 part by weight, "Vazo"), deionized water (283.3 parts by weight) was purged with nitrogen gas and polymerized for 14 to 16 hours at a temperature of 60° C. to give a 11.19% solution. The conversion was 97.03%. The resulting resin was diluted to 7.5% by weight solids with deionized water.

The resin of this example (20.5 g of a 7.5% aqueous solution), polyvinyl alcohol (30.75 g of a 7.5% aqueous solution), and $CrCl_3.6H_2O$ (1.2 g of a 5% aqueous solution) were thoroughly mixed, and the mixed composition was then knife coated onto a primed and subbed polyester film of the type described in Example 1 at a wet thickness of 100 micrometers. The coating was then dried in an oven at a temperature of 95° C. for five minutes. The film was imaged on a Hewlett-Packard Deskjet ink-jet printer to give an image that did not smear.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A liquid-absorbent composition comprising a blend of:

(a) a polymeric matrix component comprising at least one crosslinkable polymer derived from the copolymerization of 80 to 99 parts by weight at least one $\alpha,\beta$-ethylenically unsaturated monomer and from 1 to 20 parts by weight of at least one monomer having an acidic group, (b) at least one liquid-absorbent component comprising a water-absorbent polymer, and (c) a multivalent metal ion as a crosslinking agent for said polymeric matrix component, said composition capable of forming semi-interpenetrating networks wherein said polymeric matrix component is crosslinked and said at least one liquid-absorbent component is uncrosslinked, provided that said polymeric matrix component is different from said at least one liquid-absorbent component.

2. The composition of claim 1, wherein said $\alpha,\beta$-ethylenically unsaturated monomer is hydrophobic.

3. The composition of claim 2, wherein said polymeric matrix component comprises monomeric units selected from the group consisting of:

(1) acrylates and methacrylates having the structure:

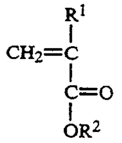

wherein $R^1$ represents hydrogen or $—CH_3$, and $R^2$ represents a member selected from the group consisting of an alkyl group having up to 18 carbon atoms, a cycloaliphatic group having up to 9 carbon atoms, a substituted or unsubstituted aryl group having up to 14 carbon atoms, and an oxygen containing heterocyclic group having up to 10 carbon atoms;

(2) acrylonitrile or methacrylonitile;

(3) styrene or α-methylstyrene having the structure:

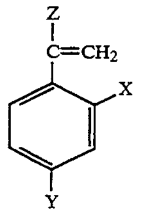

where X and Y independently represent hydrogen or alkyl groups having up to 4 carbon atoms, a halogen atom, alkyl halide group, or $OR^m$ where $R^m$ represent hydrogen or an alkyl group having up to 4 carbon atoms, and Z represents hydrogen or methyl; and (4) vinyl acetate.

4. The composition of claim 1, wherein said α,β-ethylenically unsaturated monomer is hydrophilic.

5. The composition of claim 4, wherein said hydrophilic monomer is selected from the group consisting of:

(1) Vinyl lactams having the repeating structure:

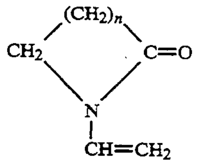

where n represents the integer 2 or 3.

(2) Acrylamide or methacrylamide having the structure:

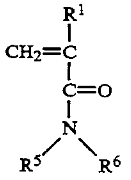

where $R^1$ represents hydrogen or $—CH_3$, $R^5$ represents hydrogen or an alkyl group having up to 10 carbon atoms, $R^6$ represents a member selected from the group consisting of hydrogen, alkyl groups having up to 10 carbon atoms, and hydroxy-substituted alkyl groups or alkoxy-substituted alkyl groups having the structure of $—(CH_2)_p—OR^7$ where p represents an integer from 1 to 3, inclusive, and $R^7$ represents hydrogen or an alkyl group having up to 10 carbon atoms.

(3) Tertiary amino alkylacrylates or tertiary amino alkylmethacrylates having the structure:

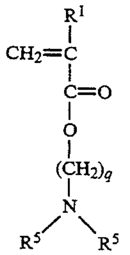

where q represents the integer 1 or 2, and $R^1$ and $R^5$ are as described previously, and each $R^5$ can be the same or different.

(4) Alkoxy alkylacrylates, hydroxy alkylacrylates, alkoxy alkylmethacrylates, or hydroxy alkylmethacrylates having the structure:

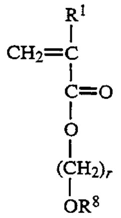

where r represents an integer from 1 to 4, inclusive, preferably 2 or 3, $R^1$ is as described previously, and $R^8$ represents hydrogen or an alkyl group having 1 to 4 carbon atoms.

(5) Alkoxy acrylates or alkoxy methacrylates having the structure:

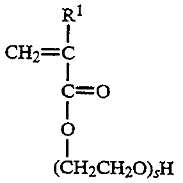

where s represents an integer from 5 to 25, inclusive, and $R^1$ is as described previously.

6. The composition of claim 1, wherein said polymeric liquid-absorbent component comprises nitrogen-containing polar compounds.

7. The composition of claim 6, wherein said polymeric liquid-absorbent component comprises polymers formed from monomeric units selected from the group consisting of:

(1) Vinyl lactams having the repeating structure:

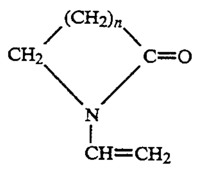

where n represents the integer 2 or 3.

(2) Tertiary amino alkylacrylates or tertiary amino alkylmethacrylates having the structure:

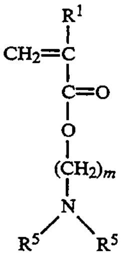

where $R^1$ represents hydrogen or $—CH_3$, $R^5$ represents hydrogen or an alkyl group having up to 10 carbon atoms, and m represents the integer 1 or 2, and each $R^5$ can be the same or different.

(3) Alkyl quaternary amino alkylacrylates or alkyl quaternary amino alkylmethacrylates.

8. The composition of claim 1, wherein said multivalent metal ion is chromium.

9. The composition of claim 1, wherein said matrix component comprises from about 23.5% to about 98.5% of said composition, said liquid-absorbent component comprises from about 1% to about 70.5% of said composition, and said crosslinking agent comprises from about 0.5% to about 6% of said composition.

10. The composition of claim 1, wherein said matrix component comprises from about 30% to about 57% of said composition, said liquid-absorbent component comprises from about 38% to about 69% of said composition, and said crosslinking agent comprises from about 1% to about 4.5% of said composition.

11. The composition of claim 1, wherein said liquid-absorbent component comprises a water-soluble polymer or a water-swellable polymer.

12. The composition of claim 1, wherein said liquid-absorbent component comprises a polymer selected from the group consisting of polyvinyl alcohol, copolymers of vinyl alcohol and vinyl acetate, polyvinyl formal, polyvinyl butyral, gelatin, carboxymethylcellulose, hydroxyethyl cellulose, hydroxypropyl cellulose, hydroxyethyl starch, polyethyl oxazoline, polyethylene oxide, polyethylene glycol, and polypropylene oxide.

13. The composition of claim 12, wherein said polymer is selected from the group consisting of polyvinyl alcohol and polyethylene oxide.

14. The composition of claim 1, wherein said liquid-absorbent component comprises a polyvinyl lactam.

15. The composition of claim 14, wherein said polyvinyl lactam is polyvinyl pyrrolidone.

16. The composition of claim 1, wherein said at least monomer having an acidic group is selected from the group consisting of acrylic acid and methacrylic acid.

17. A liquid-absorbent composition comprising a blend of:

(a) a polymeric matrix component comprising at least one crosslinkable polymer derived from hydrolysis of a polymer formed from at least one α,β-ethylenically unsaturated monomer having a pendant ester group, (b) at least one liquid-absorbent component comprising a water-absorbent polymer, and (c) a multivalent metal ion as a crosslinking agent for said polymeric matrix component, said composition capable of forming semi-interpenetrating networks wherein said polymeric matrix component is crosslinked and said at least one liquid-absorbent component is uncrosslinked, provided that said polymeric matrix component is different from said at least one liquid-absorbent component.

18. The composition of claim 17, wherein said α,β-ethylenically unsaturated monomer is hydrophobic.

19. The composition of claim 18, wherein said polymeric matrix component comprises monomeric units selected from the group consisting of:

(1) acrylates and methacrylates having the structure:

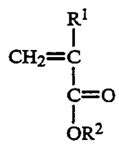

wherein $R^1$ represents hydrogen or $—CH_3$, and $R^2$ represents a member selected from the group consisting of an alkyl group having up to 18 carbon atoms, a cycloaliphatic group having up to 9 carbon atoms, a substituted or unsubstituted aryl group having up to 10 carbon atoms;

(2) acrylonitrile or methacrylonitrile;

(3) styrene or α-methylstyrene having the structure:

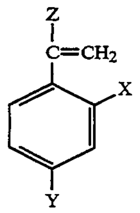

where X and Y independently represent hydrogen or alkyl groups having up to 4 carbon atoms, a halogen atom, alkyl halide group, or $OR^m$ where $R^m$ represent hydrogen or an alkyl group having up to 4 carbon atoms, and Z represents hydrogen or methyl; and (4) vinyl acetate.

20. The composition of claim 17, wherein said α,β-ethylenically unsaturated monomer is hydrophilic.

21. The composition of claim 20, wherein said hydrophilic monomer is selected from the group consisting of:

(1) Vinyl lactams having the repeating structure:

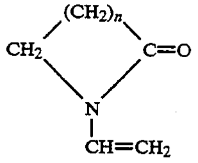

where n represents the integer 2 or 3.

(2) Acrylamide or methacrylamide having the structure:

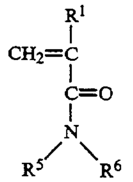

where $R^1$ represents hydrogen or $—CH_3$, $R^5$ represents hydrogen or an alkyl group having up to 10 carbon atoms, $R^6$ represents a member selected from the group consisting of hydrogen, alkyl groups having up to 10 carbon atoms, and hydroxy-substituted alkyl groups or alkoxy-substituted alkyl groups having the structure of $—(CH_2)_p—OR^7$ where p represents an integer from 1 to 3, inclusive, and $R^7$ represents hydrogen or an alkyl group having up to 10 carbon atoms.

(3) Tertiary amino alkylacrylates or tertiary amino alkylmethacrylates having the structure:

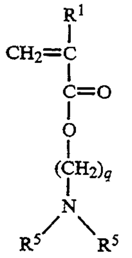

where q represents the integer 1 or 2, and $R^1$ and $R^5$ are as described previously, and each $R^5$ can be the same or different.

(4) Alkoxy alkylacrylates, hydroxy alkylacrylates, alkoxy alkylmethacrylates, or hydroxy alkylmethacrylates having the structure:

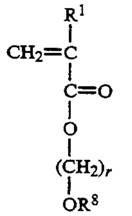

where r represents an integer from 1 to 4, inclusive, $R^1$ is as described previously, and $R^8$ represents hydrogen or an alkyl group having 1 to 4 carbon atoms.

(5) Alkoxy acrylates or alkoxy methacrylates having the structure:

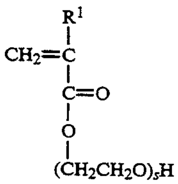

where s represents an integer from 5 to 25, inclusive, and $R^1$ is as described previously.

22. The composition of claim 17, wherein said polymeric liquid-absorbent component comprises nitrogen-containing polar compounds.

23. The composition of claim 22, wherein said polymeric liquid-absorbent component comprises polymers formed from monomeric units selected from the group consisting of:

(1) Vinyl lactams having the repeating structure:

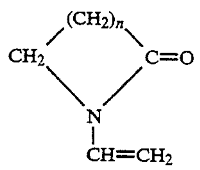

where n represents the integer 2 or 3.

(2) Tertiary amino alkylacrylates or tertiary amino alkylmethacrylates having the structure:

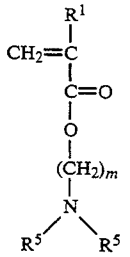

where $R^1$ represents hydrogen or $—CH_3$, $R^5$ represents hydrogen or an alkyl group having up to 10 carbon atoms, and m represents the integer 1 or 2, and each $R^5$ can be the same or different.

(3) Alkyl quaternary amino alkylacrylates or alkyl quaternary amino alkylmethacrylates.

24. The composition of claim 17, wherein said multivalent metal ion is chromium.

25. The composition of claim 17, wherein said matrix component comprises from about 23.5% to about 98.5% of said composition, said liquid-absorbent component comprises from about 1% to about 70.5% of said composition, and said crosslinking agent comprises from about 0.5% to about 6% of said composition.

26. The composition of claims 17, wherein said matrix component comprises from about 30% to about 57% of said composition, said liquid-absorbent component comprises from about 38% to about 69% of said composition, and said crosslinking agent comprises from about 1% to about 4.5% of said composition.

27. The composition of claim 17, wherein said liquid-absorbent component comprises a water-soluble polymer or a water-swellable polymer.

28. The composition of claim 17, wherein said liquid-absorbent component comprises a polymer selected from the group consisting of polyvinyl alcohol, copolymers of vinyl alcohol and vinyl acetate, polyvinyl formal, polyvinyl butyral, gelatin, carboxymethylcellulose, hydroxyethyl cellulose, hydroxypropyl cellulose, hydroxyethyl starch, polyethyl oxazoline, polyethylene oxide, polyethylene glycol, and polypropylene oxide.

29. The composition of claim 28, wherein said polymer is selected from the group consisting of polyvinyl alcohol and polyethylene oxide.

30. The composition of claim 17, wherein said liquid-absorbent component comprises a polyvinyl lactam.

31. The composition of claim 30, wherein said polyvinyl lactam is polyvinyl pyrrolidone.

* * * * *

UNITED STATES PATENT AND TRADEMARK OFFICE

CERTIFICATE OF CORRECTION

PATENT NO. : 5,376,727

DATED : December 27, 1994

INVENTOR(S) : Mohammad Iqbal, Terrance P. Smith and John J. Stofko, Jr.

It is certified that error appears in the above-indentified patent and that said Letters Patent is hereby corrected as shown below:

On the title page, the title of the invention should read -- POLYMERIC BLEND OF A MATRIX RESIN: AN ABSORBENT RESIN AND A MULTIVALENT METAL ION CROSSLINKING AGENT--.

On the title page, the name of the third inventor should read --John J. Stofko, Jr.--.

Column 5, Line 13, "a" should read --q--.

Column 5, Line 29, "i" should read --1--.

Column 18, Line 45, "claims" should read --claim--.

Signed and Sealed this

Twentieth Day of February, 1996

Attest:

BRUCE LEHMAN

Attesting Officer

*Commissioner of Patents and Trademarks*